(12) United States Patent
Keener

(10) Patent No.: US 6,419,060 B1
(45) Date of Patent: Jul. 16, 2002

(54) CLUTCH/BRAKE DRIVE

(75) Inventor: Dave Keener, Port Huron, MI (US)

(73) Assignee: Midwest Brake Bond Company, Warren, MI (US)

( * ) Notice: Subject to any disclaimer, the term of this patent is extended or adjusted under 35 U.S.C. 154(b) by 0 days.

(21) Appl. No.: 09/690,239

(22) Filed: Oct. 18, 2000

(51) Int. Cl.$^7$ ............................................. F16D 67/02
(52) U.S. Cl. ........................ 192/18 A; 192/113.24; 192/113.34; 192/12 C
(58) Field of Search ................. 192/18 A, 12 C, 192/18 R, 113.23, 113.24, 113.34

(56) References Cited

U.S. PATENT DOCUMENTS

| | | |
|---|---|---|
| 3,182,776 A | 5/1965 | Sommer |
| 3,614,999 A | 10/1971 | Sommer |
| 3,696,898 A | 10/1972 | Sommer |
| 3,713,517 A | 1/1973 | Sommer |
| 3,946,840 A | 3/1976 | Sommer |
| 4,183,425 A * | 1/1980 | Sommer .................. 192/113 B |
| 4,693,350 A | 9/1987 | Sommer |
| 5,190,129 A | 3/1993 | Sommer |
| 5,195,623 A | 3/1993 | Sommer |
| 5,487,456 A | 1/1996 | Sommer |
| 5,624,016 A * | 4/1997 | Coulter et al. ........... 192/110 S |
| 5,657,843 A | 8/1997 | Sommer |
| 5,769,187 A | 6/1998 | Sommer |
| 5,806,641 A | 9/1998 | Sommer |
| 5,921,361 A | 7/1999 | Sommer |
| 5,947,244 A | 9/1999 | Sommer |
| 5,988,326 A | 11/1999 | Sommer |
| 6,029,786 A | 2/2000 | Sommer |

\* cited by examiner

*Primary Examiner*—Saul Rodriguez
(74) *Attorney, Agent, or Firm*—Harness, Dickey & Peirce, PLC

(57) ABSTRACT

A press drive has an oil shear clutch and an oil shear brake located within a chamber defined by a housing. The chamber is filled with lubricating oil. A fluid passage is formed from the chamber through an output member and then to the friction discs of the clutch and brake. The bore through the output member includes a dam which retains a specified amount of lubricating oil within the bore. A fan cover is attached to the housing and it includes a pair of wing extensions that extend outwardly of the housing. The wing extensions direct air flow from a fan within the fan cover over the outer surface of the housing.

28 Claims, 3 Drawing Sheets

CLUTCH/BRAKE DRIVE

FIELD OF THE INVENTION

The present invention relates to a combination clutch and brake unit. More particularly, the present invention relates to a clutch and brake unit in which the frictionally engageable clutch and brake discs are immersed in a bath of oil so that the kinetic energy produced in starting and stopping heavy loads is transmitted by shearing the oil between the various clutch and brake discs.

BACKGROUND OF THE INVENTION

Dry friction clutch/brakes depend on the rubbing of a dry friction plate against a dry reaction member to start and stop a press. The continuous dry rubbing causes wearing of both the friction plate and the reaction member as well as causing the generation of heat in these members. The faster the press operates and/or the faster the flywheel rotates, the greater is the amount of wear and heat which are generated. The generation of this heat and wear requires periodic gap adjustments between the friction plate and the reaction member to keep the clutch and brake functioning and thus the press operating correctly. The trip rate or cycle speed of a press equipped with a dry friction brakeand clutch is limited because the mass of the unit determines its heat dissipation capacity. If the mass of the unit is increased to increase its heat capacity, the inertia that must be started and stopped is also increased. These factors define a closed loop from which it is impossible to escape when trying to substantially increase the performance of the system.

Oil shear brake and clutch units have been developed to eliminate the problems associated with the dry friction type of units. Properly designed oil shear brake and clutch units offer the advantage of little or no wear of the friction plates in the disc stacks and they do not produce brake fade. This provides a more precise operation of the press and dramatically increases press up-time. The oil film between the adjacent discs carries the heat generated by the start-stops of the unit away from the disc stacks. The oil provided to the brake and clutch units can be continuously circulated through the units and through a cleaning and cooling system or the oil can be kept within a sump located within the drive. Both systems ensure the consistent removal of the generated heat. This removal of heat offers the advantage that there is now no practical limit for the press trip rate and/or the rotational speed of the flywheel.

While these oil shear clutch and brake units have met with considerable success as drive units for presses, the continued development of these drive units includes the development of oil supply systems for ensuring a continuous supply of oil to the clutch discs as well as air circulation systems which direct air over the outer surface of the drive to assist in the cooling of the oil.

SUMMARY OF THE INVENTION

The present invention provides the art with a press drive system which uses an oil shear brake and an oil shear clutch. The brake and clutch units each use a disc stack of multiple discs. Cooling and lubrication oil is supplied to the disc stacks through a central bore in the output shaft and through a plurality of radial bores extending through the output shaft and opening to the inner diameter of the disc stacks. An oil cup is secured to the input shaft in order to guide the cooling and lubricating oil to the central bore in the output shaft. In addition, a unique shroud and fan design located adjacent the input end of the drive unit provides a continuous flow of air over the unit in order to increase the cooling for the oil and drive unit.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
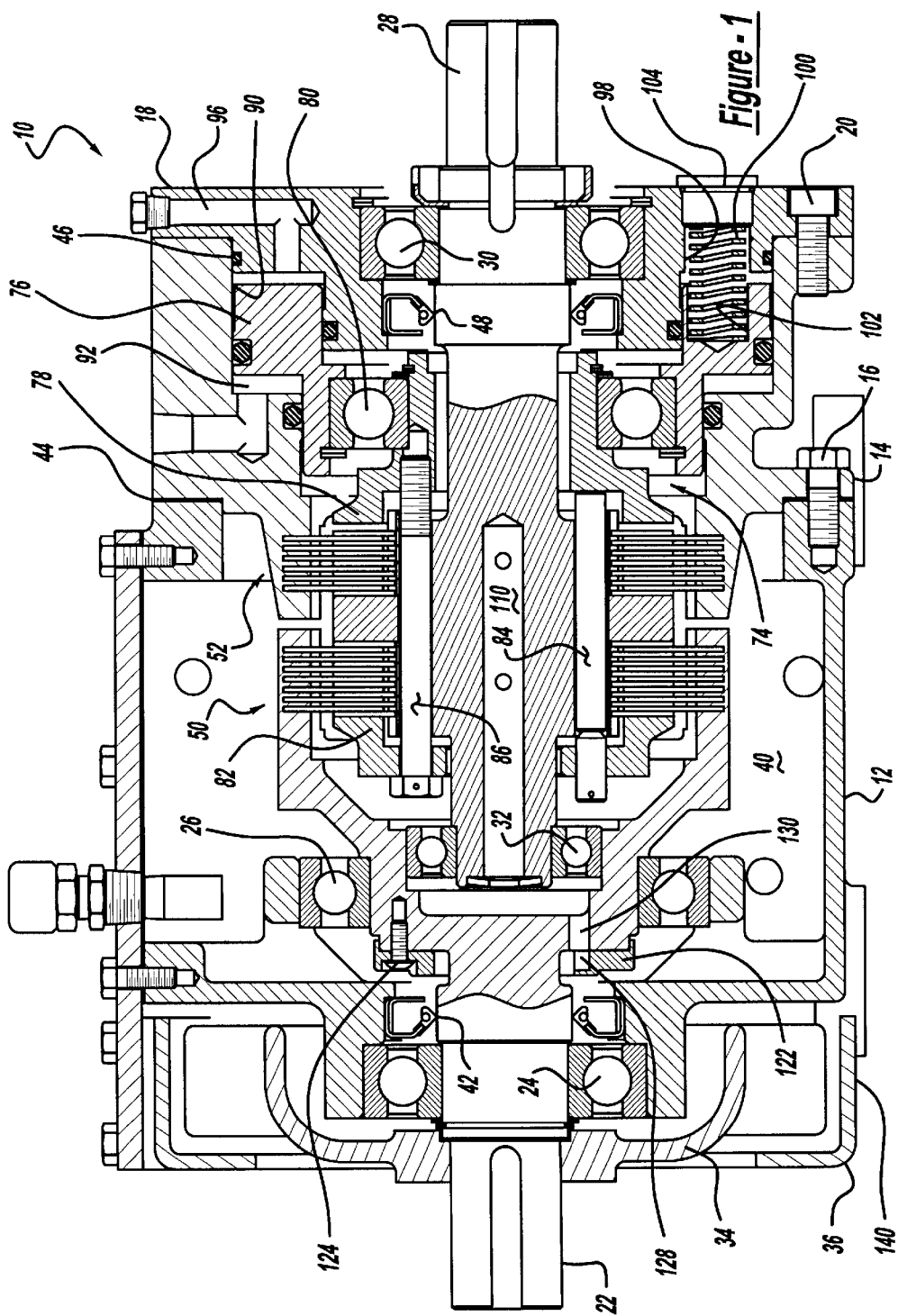
FIG. 1 is a vertical cross section of an oil shear drive unit which incorporates the unique features in accordance with the present invention.
Figure 2:
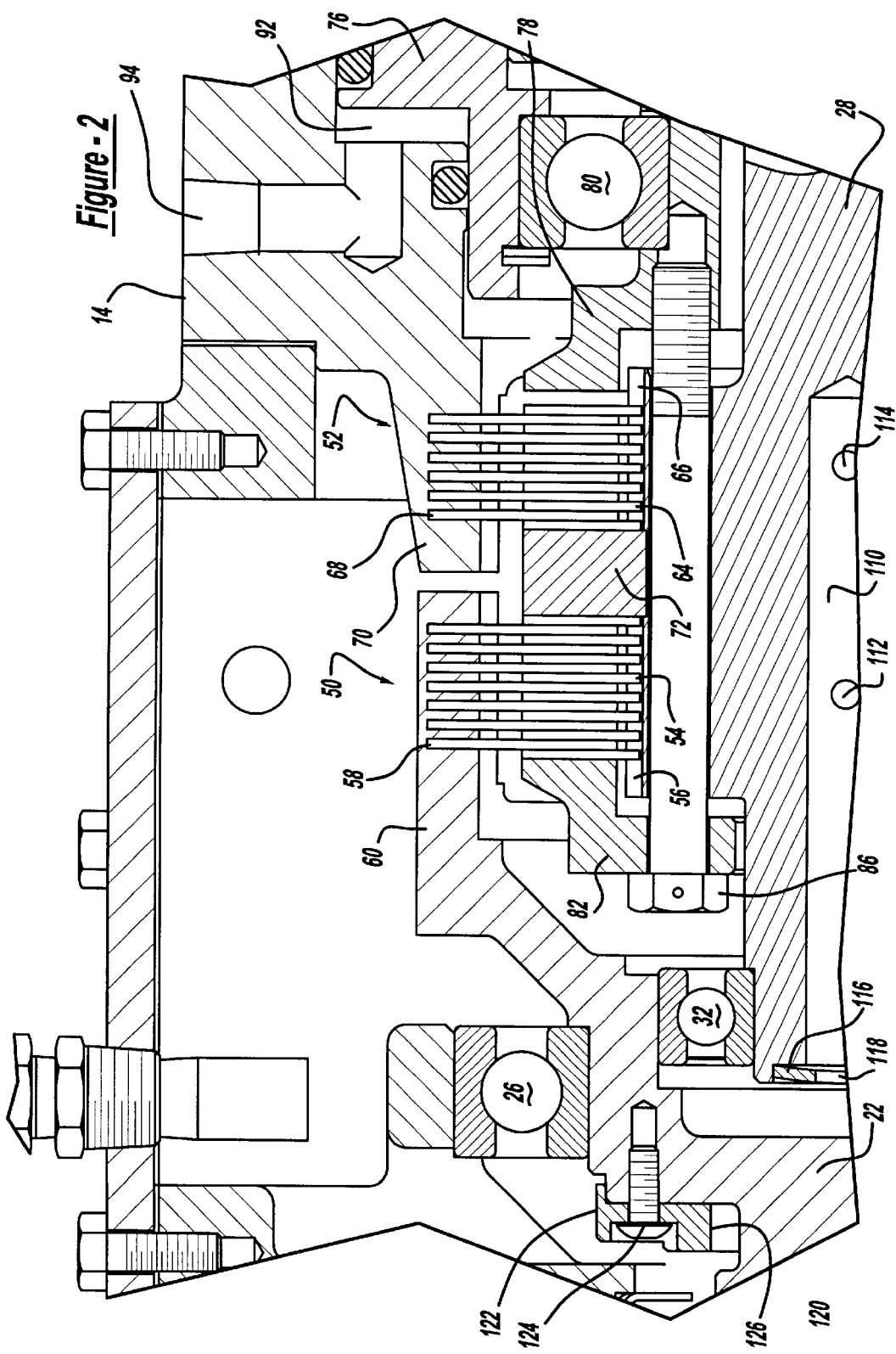
FIG. 2 is an enlarged vertical cross section of the brake and clutch units illustrated in FIG. 1.

Referring now to the drawings in which like reference numerals designate like or corresponding parts throughout the several views, there is shown in FIGS. 1 and 2 a press drive which includes the oil shear brake and clutch units in accordance with the present invention and which is designated generally by the reference numeral 10. Press drive 10 has a main housing 12 to which is attached an end housing 14 using a plurality of bolts 16. A bearing housing 18 is secured to end housing 14 using a plurality of bolts 20. An input shaft 22 is rotatably supported by main housing 12 using a bearing 24 and a bearing 26. An output shaft 28 is rotatably supported by bearing housing 18 using a bearing 30 and it is rotatably supported by input shaft 22 using a bearing 32. A fan 34 is secured to input shaft 22 to rotate therewith and a fan cover 36 supported by main housing 12 surrounds fan 34 to direct the air blown by fan 34 over housings 12, 14 and 18.

Housings 12, 14 and 18 cooperate to define a chamber 40 which is sealed by a seal 42 disposed between main housing 12 and input shaft 22, a gasket 44 disposed between main housing 12 and end housing 14, a seal 46 disposed between end housing 14 and bearing housing 18 and a seal 48 disposed between bearing housing 18 and output shaft 28. Chamber 40 is designed to be filled with lubricating oil to provide cooling and lubricating oil for the various components of press drive 10.

Disposed within chamber 40 is an oil shear clutch unit 50 and an oil shear brake unit 52. Clutch unit 50 includes a plurality of friction discs 54 which each engage a plurality of splines 56 located on output shaft 28. Discs 54 are allowed to move axially along splines 56 but they are prohibited from rotating with respect to splines 56 and thus discs 54 rotate with output shaft 28. A plurality of friction clutch plate members 58 are interleaved with friction discs 54 and they are each provided with a plurality of circumferentially spaced slots for keyed engagement with a plurality of spaced drive lugs 60 that are formed as a part of input shaft 22. Friction clutch plate members 58 are allowed to move axially with respect to lugs 60 but they are prohibited from rotating with respect to lugs 60 and thus friction clutch plate members rotate with input shaft 22.

Brake unit 52 includes a plurality of brake friction discs 64 which each engage a plurality of splines 66 located on output shaft 28. Preferably, friction discs 64 are identical to friction discs 54. Discs 64 are allowed to move axially along splines 66 but are prohibited from rotating with respect to splines 66 and thus discs 64 rotate with output shaft 28. A plurality of friction brake plate members 68 are interleaved with friction discs 64 and they are provided with a plurality of spaced slots for keyed engagement with a plurality of spaced drive lugs 70 that are formed as a part of end housing 14. Preferably plate members 68 are identical to plate members 58. Friction plate members 68 are allowed to move axially with respect to lugs 70 but they are prohibited from rotating with respect to end housing 14. End housing 14 is a stationary member and thus lugs 70 of end housing 14 provide a stationary reaction member for brake unit 52.

A center ring 72 is disposed between clutch unit 50 and brake unit 52 to act as a reaction member for friction discs 54 and plate members 58 as well as a reaction member for friction discs 64 and plate members 68 as detailed below. Center ring 72 is secured to output shaft 28 such that axial motion and rotational motion with respect to output shaft 28 is prohibited. Thus, center ring 72 rotates with output shaft 28 but does not move axially with respect to output shaft 28 to provide a reaction member for clutch unit 50 and brake unit 52.

A drive actuating assembly 74 engages and disengages clutch unit 50 and applies and releases brake unit 52. Drive actuating assembly 74 comprises a non-rotating piston 76, a brake actuator 78, a bearing 80, a clutch actuator 82, a plurality of push bolts 84 and a plurality of pull bolts 86.

Non-rotating piston 76 is disposed within a pocket 90 defined by end housing 14 and bearing housing 18. Piston 76 and end housing 14 define a pressure chamber 92 which is utilized to actuate press drive 10 as detailed below. A pressurized oil port 94 extends through end housing 14 to provide access to pressure chamber 92. A breather port 96 extends through bearing housing 18 to vent the non-pressurized side of piston 76. Bearing housing 18 defines a plurality of bores 98 within each of which is disposed a coil spring 100. Coil springs 100 extend through bores 98 and are received within a plurality of spring pockets 102 defined by piston 76. A plug 104 closes each bore 98 and provides access to coil springs 100 from outside of press drive 10. Thus, coil springs 100 can be replaced without having to disassemble press drive 10. Coil springs 100 urge clutch unit 50 into a disengaged condition and brake unit 52 into an applied condition as detailed below.

Bearing 80 is disposed between piston 76 and brake actuator 78 thus allowing brake actuator 78 to rotate within output shaft 28. Brake actuator 78 is attached to clutch actuator 82 by bolts 84 and 86. Push bolts 84 are threadingly received by clutch actuator 82. They extend through a bore defined by output shaft 28 and they engage brake actuator 78. Pull bolts 86 extend through a bore in clutch actuator 82, through a bore defined by output shaft 28 and are threadingly received by brake actuator 78.

Drive actuating assembly 74 moves with respect to clutch unit 50 and brake unit 52 from a normal position where brake unit 52 is applied and clutch unit 50 is disengaged to an actuated position where brake unit 52 is released and clutch unit 50 is engaged. The normal position is the result of the biasing of coil springs 100. During the movement between these two positions, it is imperative that any overlap between the application of brake unit 52 and the engagement of clutch unit 50 is avoided. If brake unit 52 is partially applied and clutch unit 50 is simultaneously partially engaged, excessive heat and wear of discs 54 and 64 and plate members 58 and 68 will occur. The control of this non-overlap zone where brake unit 52 is released and clutch unit 50 is disengaged is accomplished by controlling the gap between actuating assembly 74, clutch unit 50 and brake unit 52. The present invention utilizes bolts 84 and 86 to control this gap.

This gap is controlled by positioning brake actuator 78 with respect to clutch actuator 82 by simultaneously adjusting push bolts 84 and pull bolts 86. Due to the minimal wear of brake unit 52 and clutch unit 50, this initial adjustment should keep the gap within acceptable limits for the life of press drive 10. When press drive 10 is torn down for rework and/or refurbishing, the gap can again be set using bolts 84 and 86.

The operation of press drive 10 begins with input shaft 22 rotating on bearings 24, 26 and 32 with output shaft 28 being held stationary by brake unit 52 due to the compression of the pack of brake friction discs 64 and brake plate members 68. This compression locks output shaft 28 to stationary end housing 14. When it is desired to power output shaft 28 by input shaft 22, pressurized hydraulic fluid is provided to pressure chamber 92 through oil port 94. The pressurized hydraulic fluid reacts against piston 76 to overcome the biasing of coil springs 100 and move actuating assembly 74 towards clutch unit 50. The movement of actuating assembly 74 towards clutch unit 50 first removes the compression between brake friction discs 64 and brake plate members 68 to release brake unit 52 and then it applies compressive loads to clutch friction plates 54 and clutch plate members 58 to engage clutch unit 50. The timing between the release of brake unit 52 and the engagement of clutch unit 50 is controlled by the gap for actuating assembly 74 which is built into press drive 10 using bolts 84 and 86 as described above. The engagement of clutch unit 50 powers output shaft 28 by input shaft 22 through discs 54 and plate members 58. Input shaft 22 will power output shaft 28 as long as pressurized hydraulic fluid is supplied to chamber 92. When pressurized fluid is released from chamber 92, coil springs 100 will move actuating assembly 74 towards brake unit 52 to disengage clutch unit 50 and apply brake unit 52 as described above. The use of hydraulic fluid or oil for press drive 10 provides the advantage of minimizing the size of chamber 92 when compared with air actuated press drives.

Lubrication for clutch unit 50 and brake unit 52 is provided by a bore 110 that extends axially into output shaft 28 and which mates with a first plurality of radial bores 112 and a second plurality of radial bores 114. Bores 112 open at a position radially inward of discs 54 and plate members 58 and bores 114 open radially inward of discs 64 and plates 68. An end plug 116 closes the end of bore 110. End plug 116 defines a central hole 118 which is smaller in diameter than the diameter of bore 110. By having hole 118 smaller than bore 110, a cylindrical wall of oil will always be present within bore 110 due to end plug 116 acting as a dam. The width of the cylindrical wall of oil will be determined by the size relationship of hole 118 to bore 110. This cylindrical wall of oil will be disposed within bore 110 even with the rotation of output shaft 28. The end of output shaft 28 and thus both bores 110 and 118 are open to a pocket 120 formed by input shaft 22.

An oil cup 122 is secured to input shaft 22 using a plurality of bolts 124. Oil cup 122 defines a central bore 126 which is larger in diameter than input shaft 22 at the position where bore 126 mates with input shaft 22. Oil cup 122 defines an axial passage 128 which mates with a bore 130 extending through input shaft 22 to connect chamber 40 with pocket 120. Oil disposed within chamber 40 flows from chamber 40 through the gap between bore 126 and input shaft 22, through passage 128, through bore 130 and into pocket 120. As the oil in pocket 120 fills pocket 120, oil flows through hole 118 into bore 110 to form the cylinder of oil within bore 110. This cylinder of oil flows through radial bores 112 to provide oil to clutch unit 50 and through bores 114 to provide oil to brake unit 52. The oil flowing to clutch unit 50 and brake unit 52 is constantly being replaced with oil from chamber 40 as described above. The forming of the cylinder of oil by end plug 116 ensures a constant supply of oil to clutch unit 50 and brake unit 52 even during the rotation of output shaft 28.

Figure 3:
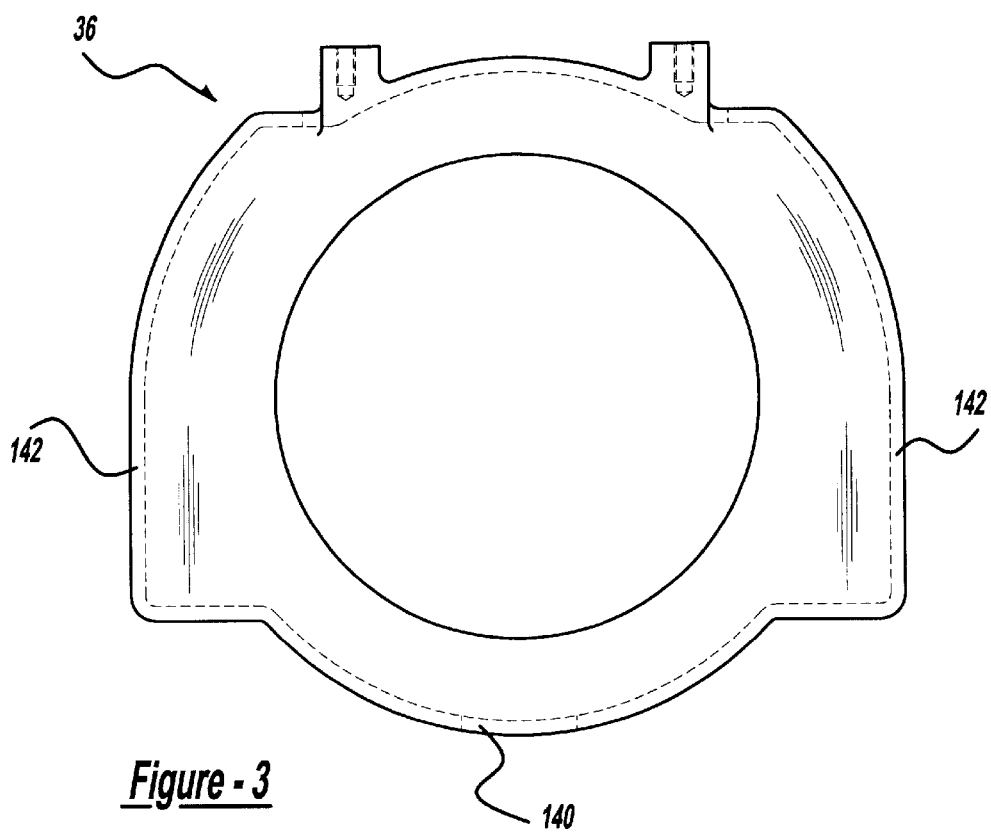
FIG. 3 is an end view of the fan cover illustrated in FIG. 1.
Figure 4:
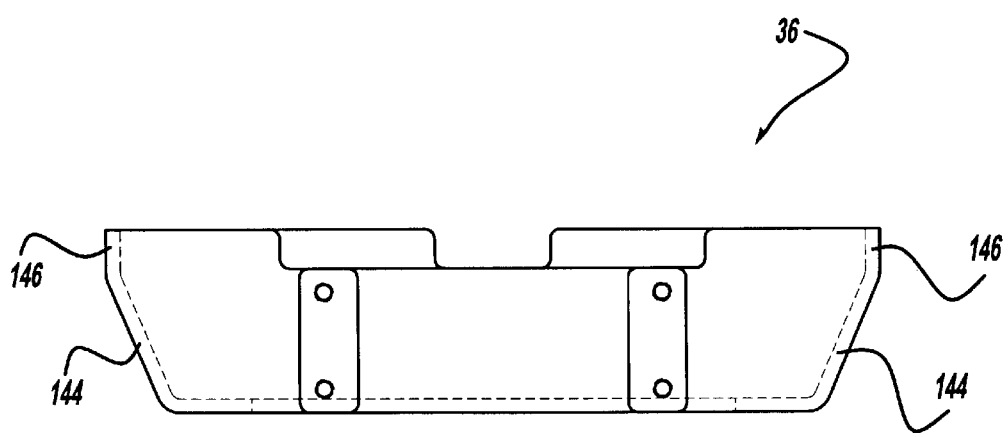
FIG. 4 is a top plan view of the fan cover illustrated in FIG. 3.

Referring now to FIGS. 3 and 4, fan cover 36 is shown in greater detail. Fan cover 36 includes a central generally circular main body 140 and a pair of wing extensions 142 extending outward from opposite sides of fan cover 36. Circular main body 140 is generally the same size as main housing 12 and thus wings 142 extend outward of main body 140 and main housing 12. Each wing 142 includes an angular wall 144 and a straight wall 146 which extends in a direction generally parallel with the axis of input shaft 22. As fan 34 rotates with input shaft 22, air blown by fan 34 impacts angular wall 144 and is guided by straight wall 146 over the exterior surface of main housing 12 to provide cooling for main housing 14 along with the oil and drive components within main housing 12.

While the above detailed description describes the preferred embodiment of the present invention, it should be understood that the present invention is susceptible to modification, variation and alteration without deviating from the scope and fair meaning of the subjoined claims.

What is claimed is:

1. A drive unit comprising:
    a stationary housing defining a chamber;
    an input member rotatably supported with respect to said stationary housing;
    an output member rotatably supported with respect to said stationary housing and said input member;
    a selectively operable brake for prohibiting rotation of said output member with respect to said stationary housing, said brake including a plurality of brake friction discs interleaved with a plurality of brake plate members;
    a selectively operable clutch for prohibiting rotation of said output member with respect to said input member, said clutch including a plurality of clutch friction discs interleaved with a plurality of clutch plate members; and
    a lubricant passage extending from said chamber to one of said plurality of brake friction discs and said plurality of clutch friction plates, said lubricant passage including a bore extending into said output member;
    a dam disposed within said lubricant passage, said dam retaining a specified amount of lubricant within said bore of said output member, said dam comprising an end plug secured to said output member, said end plug defining a hole.

2. The drive unit according to claim 1, wherein said hole is smaller than said bore.

3. The drive unit according to claim 1 wherein said input member defines a pocket in communication with said bore through said hole.

4. The drive unit according to claim 3, wherein said input member defines a fluid passage extending between said chamber and said pocket.

5. The drive unit according to claim 4, further comprising an oil cup secured to said input member, said oil cup directing lubricant flow from said chamber to said fluid passage.

6. The drive unit according to claim 1, further comprising an oil cup secured to said input member, said oil cup directing lubricant flow from said chamber to said bore.

7. The drive unit according to claim 6, wherein said input member defines a fluid passage extending between said chamber and said bore, said oil cup directing said lubricant flow from said chamber to said fluid passage.

8. The drive unit according to claim 1, further comprising a fan attached to said input member and a fan cover attached to said stationary housing, said fan being disposed within said cover.

9. The drive unit according to claim 8, wherein said fan cover includes a wing extension extending outward of said stationary housing, said wing extension directing air flow over an outer surface of said stationary housing.

10. The drive unit according to claim 9, wherein said wing extension includes an angular wall for deflecting said air flow.

11. The drive unit according to claim 8, wherein said fan cover includes a first wing extension disposed on a first side of said fan cover and a second wing extension disposed on a second side of said fan cover, said first and second wing extensions extending outward of said stationary housing to direct air flow over an outer surface of said stationary housing.

12. The drive unit according to claim 11, wherein said first wing extension includes a first angular wall for deflecting said air flow and said second wing extension includes a second angular wall for deflecting said air flow.

13. A drive unit comprising:
    a stationary housing defining a chamber;
    an input member rotatably supported with respect to said stationary housing;
    an output member rotatably supported with respect to said stationary housing and said input member;
    a selectively operable brake for prohibiting rotation of said output member with respect to said stationary housing, said brake including a plurality of brake friction discs interleaved with a plurality of brake plate members;
    a selectively operable clutch for prohibiting rotation of said output member with respect to said input member, said clutch including a plurality of clutch friction discs interleaved with a plurality of clutch plate members;
    a fan attached to said input member;
    a fan cover attached to said stationary housing, said fan being disposed within said fan cover, said fan cover including a first wing extension extending outward of said stationary housing, said first wing extension directing air flow over an outer surface of said stationary housing, said fan cover including a second wing extension extending outward of said stationary housing, said second wing extension directing said air flow over said outer surface of said stationary housing.

14. The drive unit according to claim 13, wherein said first wing extension includes an angular wall for deflecting said air flow.

15. The drive unit according to claim 13, wherein said first wing extension includes a first angular wall for deflecting said air flow and said second wing extension includes a second angular wall for deflecting said air flow.

16. The drive unit according to claim 13, further comprising a lubricant passage extending from said chamber to one of said plurality of brake friction discs and said plurality of clutch friction plates, said lubricant passage including a bore extending into said output member.

17. The drive unit according to claim 16, further comprising an end plug secured to said output member, said end plug defining a hole, said end plug creating a dam for retaining a specified amount of lubricant within said bore of said output member.

18. The drive unit according to claim 17, wherein said hole is smaller than said bore.

19. The drive unit according to claim 17, wherein said input member defines a pocket in communication with said bore through said hole.

20. The drive unit according to claim 19, wherein said input member defines a fluid passage extending between said chamber and said pocket.

21. The drive unit according to claim 20, further comprising an oil cup secured to said input member, said oil cup directing lubricant flow from said chamber to said fluid passage.

22. A drive unit comprising:

a stationary housing defining a chamber;

an input member rotatably supported with respect to said stationary housing;

an output member rotatably supported with respect to said stationary housing and said input member;

a selectively operable brake for prohibiting rotation of said output member with respect to said stationary housing, said brake including a plurality of brake friction discs interleaved with a plurality of brake plate members;

a selectively operable clutch for prohibiting rotation of said output member with respect to said input member, said clutch including a plurality of clutch friction discs interleaved with a plurality of clutch plate members;

a fan attached to said input member;

a fan cover attached to said stationary housing, said fan being disposed within said fan cover, said fan cover including a first wing extension extending outward of said stationary housing, said first wing extension directing air flow over an outer surface of said stationary housing;

a lubricant passage extending from said chamber to one of said plurality of brake friction discs and said plurality of clutch friction plates, said lubricant passage including a bore extending into said output member; and an end plug secured to said output member, said end plug defining a hole, said end plug creating a dam for retaining a specified amount of lubricant within said bore of said output member.

23. The drive unit according to claim 22, wherein said hole is smaller than said bore.

24. The drive unit according to claim 22, wherein said input member defines a pocket in communication with said bore through said hole.

25. The drive unit according to claim 24, wherein said input member defines a fluid passage extending between said chamber and said pocket.

26. The drive unit according to claim 25, further comprising an oil cup secured to said input member, said oil cup directing lubricant flow from said chamber to said fluid passage.

27. A drive unit comprising:

a stationary housing defining a chamber;

an input member rotatably supported with respect to said stationary housing;

an output member rotatably supported with respect to said stationary housing and said input member;

a selectively operable brake for prohibiting rotation of said output member with respect to said stationary housing, said brake including a plurality of brake friction discs interleaved with a plurality of brake plate members;

a selectively operable clutch for prohibiting rotation of said output member with respect to said input member, said clutch including a plurality of clutch friction discs interleaved with a plurality of clutch plate members; and a lubricant passage extending from said chamber to one of said plurality of brake friction discs and said plurality of clutch friction plates, said lubricant passage including a bore extending into said output member;

a dam disposed within said lubricant passage, said dam retaining a specified amount of lubricant within said bore of said output member;

a fan attached to said input member and a fan cover attached to said stationary housing, said fan being disposed within said cover, said fan cover including a first wing extension disposed on a first side of said fan cover and a second wing extension disposed on a second side of said fan cover, said first and second wing extensions extending outward of said stationary housing to direct air flow over an outer surface of said stationary housing.

28. The drive unit according to claim 27, wherein said first wing extension includes a first angular wall for deflecting said air flow and said second wing extension includes a second angular wall for deflecting said air flow.

* * * * *